(12) United States Patent
Goeddeke et al.

(10) Patent No.: US 11,840,961 B2
(45) Date of Patent: *Dec. 12, 2023

(54) GAS TURBINE ENGINE FUEL INJECTOR

(71) Applicant: Woodward, Inc., Fort Collins, CO (US)

(72) Inventors: Mark G. Goeddeke, West Olive, MI (US); Michael Stratton, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/109,407

(22) Filed: Dec. 2, 2020

(65) Prior Publication Data
US 2021/0254551 A1 Aug. 19, 2021

Related U.S. Application Data

(63) Continuation of application No. 15/928,700, filed on Mar. 22, 2018, now Pat. No. 10,865,714.

(51) Int. Cl.
  *F02C 7/22* (2006.01)
  *F16L 11/22* (2006.01)

(52) U.S. Cl.
  CPC .............. *F02C 7/222* (2013.01); *F16L 11/22* (2013.01); *F05D 2220/32* (2013.01)

(58) Field of Classification Search
  CPC . F02C 7/222; F16L 11/20; F16L 11/22; F05D 2220/32; F23R 3/28; F23R 3/283; F23R 3/286; F23R 3/343; F23R 2900/00005
  See application file for complete search history.

(56) References Cited

U.S. PATENT DOCUMENTS

| | | |
|---|---|---|
| 4,624,485 A | 11/1986 | McStavick et al. |
| 4,735,044 A | 4/1988 | Richey et al. |
| 5,076,242 A | 12/1991 | Parker |
| 5,239,964 A | 8/1993 | Diener et al. |
| 5,269,468 A | 12/1993 | Adiutori |
| 5,361,578 A | 11/1994 | Donlan |

(Continued)

FOREIGN PATENT DOCUMENTS

| | | |
|---|---|---|
| CN | 104969003 | 10/2015 |
| CN | 105829802 | 8/2016 |

(Continued)

OTHER PUBLICATIONS

Chinese Office Action in CN Appln. No. 201980034332.2, dated Jan. 30, 2022, 8 pages with English Translation.

(Continued)

*Primary Examiner* — Loren C Edwards
(74) *Attorney, Agent, or Firm* — Fish & Richardson P.C.

(57) ABSTRACT

The subject matter of this specification can be embodied in, among other things, a fuel injector for a gas turbine engine includes a fuel injector housing, and an elongated fuel tube held in position in said housing by spaced apart joints and including an undulating tube surface along at least a portion of its length between said joints, said undulating tube surface being in contact with another surface disposed in said housing at one or more locations of said undulating tube surface.

14 Claims, 9 Drawing Sheets

(56) References Cited

U.S. PATENT DOCUMENTS

| | | | |
|---|---|---|---|
| 5,423,178 A | 6/1995 | Mains | |
| 5,611,373 A | 3/1997 | Ashcraft | |
| 6,009,908 A | 1/2000 | Hartnagel et al. | |
| 6,076,356 A | 6/2000 | Pelletier | |
| 6,131,615 A | 10/2000 | Hartnagel et al. | |
| 6,145,545 A | 11/2000 | Hartnagel et al. | |
| 6,149,075 A | 11/2000 | Moertle et al. | |
| 6,270,024 B1 | 8/2001 | Popp | |
| 6,276,141 B1 | 8/2001 | Pelletier | |
| 6,351,948 B1 * | 3/2002 | Goeddeke | F23D 11/36 60/740 |
| 6,357,222 B1 | 3/2002 | Schilling et al. | |
| 6,425,532 B1 | 7/2002 | Popp | |
| 6,523,350 B1 | 2/2003 | Mancini et al. | |
| 6,565,126 B1 | 5/2003 | Julien et al. | |
| 6,761,035 B1 | 7/2004 | Mueller | |
| 6,877,306 B2 | 4/2005 | Wember et al. | |
| 6,915,638 B2 | 7/2005 | Runkle et al. | |
| 7,025,126 B1 | 4/2006 | Wyatt et al. | |
| 7,114,336 B2 | 10/2006 | Hommema | |
| 7,521,035 B1 | 4/2009 | Grob et al. | |
| 7,900,456 B2 | 3/2011 | Mao | |
| 7,921,649 B2 | 4/2011 | Lehtinen et al. | |
| 8,205,643 B2 | 6/2012 | Lee et al. | |
| 9,581,121 B2 | 2/2017 | Ryon et al. | |
| 9,638,422 B2 | 5/2017 | Hall et al. | |
| 2001/0030248 A1 | 10/2001 | Popp | |
| 2002/0157719 A1 | 10/2002 | Ikegawa | |
| 2003/0217779 A1 | 11/2003 | Schippl | |
| 2007/0251503 A1 | 11/2007 | Buehner | |
| 2007/0283931 A1 | 12/2007 | Mao | |
| 2008/0098737 A1 | 1/2008 | Haggerty et al. | |
| 2008/0173060 A1 | 7/2008 | Cymbalisty et al. | |
| 2009/0126687 A1 | 5/2009 | Paterson | |
| 2009/0293483 A1 | 12/2009 | Bishara | |
| 2010/0044472 A1 | 2/2010 | Smith | |
| 2010/0051728 A1 | 3/2010 | Hicks | |
| 2010/0071666 A1 | 3/2010 | Lee et al. | |
| 2010/0071667 A1 | 3/2010 | Hicks et al. | |
| 2010/0205970 A1 | 8/2010 | Hessler et al. | |
| 2011/0073071 A1 | 3/2011 | Smith | |
| 2015/0135716 A1 | 5/2015 | Ginessin et al. | |
| 2017/0122564 A1 | 5/2017 | Cadman et al. | |
| 2017/0176011 A1 | 6/2017 | Caples | |
| 2019/0292987 A1 | 9/2019 | Goeddeke | |

FOREIGN PATENT DOCUMENTS

| | | |
|---|---|---|
| DE | 4127455 | 2/1993 |
| EP | 1793169 | 6/2007 |
| FR | 2494777 | 5/1982 |
| IL | 63170 | 8/1985 |
| JP | S50142214 | 11/1975 |
| JP | H05052496 | 7/1993 |
| JP | H0849513 | 2/1996 |
| JP | 2006-138566 | 6/2006 |
| KR | 100212995 | 8/1999 |

OTHER PUBLICATIONS

International Preliminary Report on Patentability in International Application No. PCT/US2019/023469, dated Jul. 1, 2020, 14 pages.

International Search Report and Written Opinion in International Application No. PCT/US2019/023469, dated Nov. 21, 2019, 15 pages.

Chinese Office Action in CN Appln. No. 201980034332.2, dated Apr. 20, 2022, 10 pages (with English Translation).

Search Report in Chinese Appln. No. 20190034332.2, dated Apr. 14, 2022, 3 pages (with English Translation).

Chinese Office Action in CN Appln. No. 201980034332.2, dated Jan. 9, 2023, 10 pages (with English Translation).

* cited by examiner

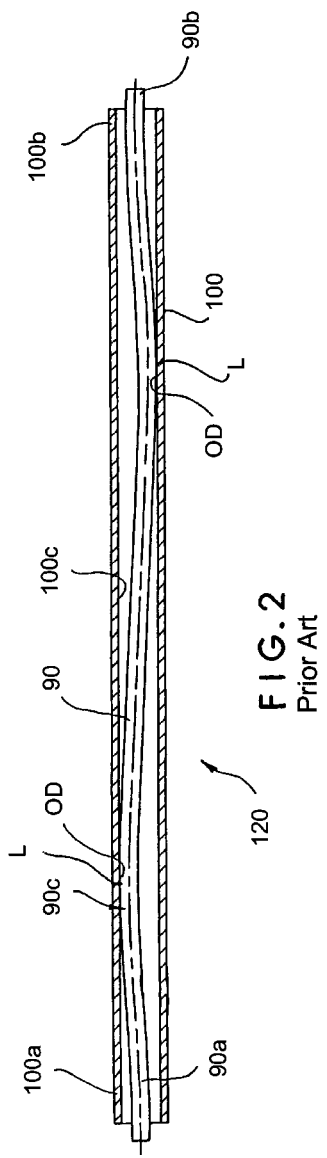

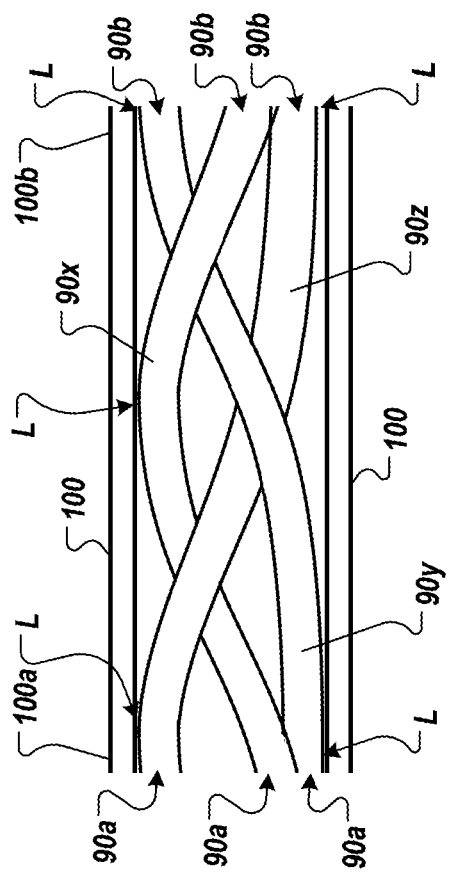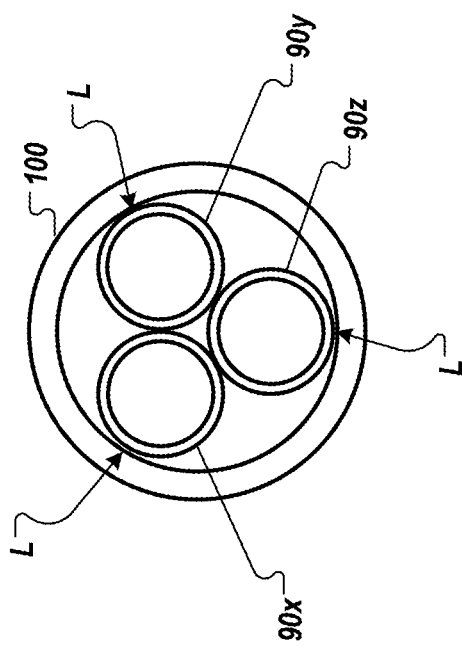
FIG. 5A
FIG. 5B

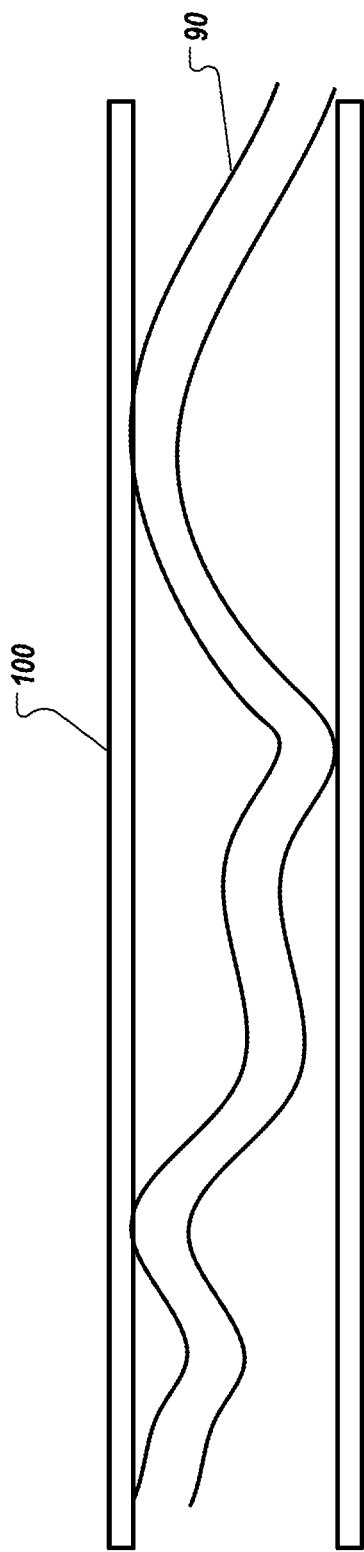

GAS TURBINE ENGINE FUEL INJECTOR

CROSS-REFERENCE TO RELATED APPLICATION(S)

This application is a continuation of and claims the benefit of priority to U.S. patent application Ser. No. 15/928,700, filed Mar. 22, 2018, the contents of which are incorporated by reference herein.

TECHNICAL FIELD

This instant specification relates to gas turbine engine fuel injectors and, in particular, fuel injectors for the combustor of a gas turbine engine.

BACKGROUND

Pressure atomizing fuel injectors for supplying primary fuel and secondary fuel to the combustor of a gas turbine engine are in use. These pressure atomizing injectors typically include a primary fuel tube to provide a relatively low fuel flow rate to a primary fuel discharge orifice of the injector during all regimes of engine operation. The primary fuel tube usually is disposed within a secondary fuel tube that provides a variable, metered secondary fuel flow to a secondary fuel discharge orifice as needed during high power engine operation regimes. During high power engine operation, the secondary fuel flows through the secondary fuel tube about the primary fuel tube to maintain the latter relatively cooler compared to the former.

A particular pressure atomizing fuel injector assembles the primary fuel tube and secondary fuel tube in the injector housing by metallurgical braze or weld joints near opposite ends thereof. During high power engine operation, the fuel injector undergoes thermal expansion and vibration resonance, which generate internal stresses, especially on the relatively cooler primary fuel tube, found to cause premature fatigue failure (cracking) of one or more of the brazed joints proximate the opposite ends of the primary fuel tube. Fatigue failure of the braze joints of the primary fuel tube can lead to primary fuel internal leakage and requires costly repair or overhaul of the affected fuel injector.

SUMMARY

In general, this document describes gas turbine engine fuel injectors and, in particular, fuel injectors for the combustor of a gas turbine engine.

In a first aspect, a fuel injector for a gas turbine engine includes a fuel injector housing, and an elongated fuel tube held in position in said housing by spaced apart joints and including an undulating tube surface along at least a portion of its length between said joints, said undulating tube surface being in contact with another surface disposed in said housing at one or more locations of said undulating tube surface.

Various embodiments can include some, all, or none of the following features. Opposite end regions of said elongated fuel tube can be held in position by said joints and said undulating tube surface can extend from one of said end regions to the other of said end regions. Opposite end regions of said elongated fuel tube can include metallurgically joined joints. The another surface can be an inner surface of a second fuel tube disposed about said elongated fuel tube in said housing. The another surface can be an outer surface of a second elongated fuel tube disposed inside said fuel tube in said housing. The another surface can define a passage in an injector strut. The undulating tube surface can form a helical or spiral tube surface. The fuel injector can include a second elongated fuel tube held in position in said housing by spaced apart joints and including a second undulating tube surface along at least a portion of its length between said joints, said second undulating tube surface being in contact with said another surface disposed in said housing at one or more locations of said second undulating spiral tube surface. The another surface can be an inner surface of a second fuel tube disposed about said second elongated fuel tube in said housing.

In a second aspect, a fuel injector for a gas turbine engine includes a fuel injector housing having an internal wall and internal passage therein, an elongated secondary fuel tube disposed in said internal passage, said elongated secondary fuel tube having an undulating outer surface along at least a portion of its length and having an undulating inner surface along at least a portion of its length, said undulating outer surface being in contact with said internal wall at one or more locations of said undulating outer surface, and an elongated primary fuel tube disposed in said secondary fuel tube and held in position therein by spaced apart joints, said primary fuel tube including an elongated outer surface along at least a portion of its length between said joints, said elongated outer surface being in contact with said undulating inner surface at one or more locations of said elongated outer surface to reduce fatigue failure at said joints during service in a gas turbine engine.

In a third aspect, an assembly for a fuel injector includes an elongated first fuel tube and an elongated second fuel tube disposed in said first fuel tube, one of said first fuel tube and second fuel tube including a undulating surface along at least a portion of its length, said undulating surface being in contact between said first fuel tube and second fuel tube at one or more locations of said undulating surface.

Various embodiments can include some, all, or none of the following features. The first fuel tube can include said undulating surface. The second fuel tube can include said undulating surface.

In a fourth aspect, a method of assembly includes bending an elongated fuel tube having a tube surface such that the tube surface is an undulating tube surface along at least a portion of its length, and contacting the undulating tube surface to another surface disposed in a fuel injector housing at one or more locations of said undulating tube surface.

Various implementations can include some, all, or none of the following features. The method can include forming spaced apart joints between said fuel tube and said housing, configured to hold said elongated fuel tube in position in said housing. The another surface can include an inner surface of a second fuel tube disposed about said elongated fuel tube in said housing. The another surface can include an outer surface of a second elongated fuel tube disposed inside said fuel tube in said housing. The method can include bending the another surface based on the contacting. The another surface can defines a passage in an injector strut. The another surface can include an inner surface of a second fuel tube disposed about said second elongated fuel tube in said housing. Bending an elongated fuel tube can include forming said undulating tube surface as a helical or spiral tube surface. The method can also include bending a second elongated fuel tube having a second tube surface such that the second tube surface is a second undulating tube surface along at least a portion of its length, and contacting the second undulating tube surface to said surface disposed in said fuel injector housing at one or more locations of said second undulating tube surface.

The systems and techniques described here may provide one or more of the following advantages. First, a fuel injector can provide reduced fatigue failure (cracking) of the metallurgical joints during service in a gas turbine. Second, the fuel injector can provide reduced occurrence of resonant frequencies. Third, the fuel injector can provide a structure in which fuel delivery tubes are supported with reduced contact areas and thermal transfer characteristics.

The details of one or more implementations are set forth in the accompanying drawings and the description below. Other features and advantages will be apparent from the description and drawings, and from the claims.

DESCRIPTION OF DRAWINGS

FIG. 1A is an enlarged cross-sectional view of the metering valve region of the example fuel injector of FIG. 1, while

FIG. 2 is a sectional view of an example of a straight secondary fuel tube having an undulating primary fuel tube disposed therein prior to assembly in the fuel injector housing.

FIGS. 5A and 5B are sectional side and end views of an example of a straight secondary fuel tube having multiple undulating primary fuel tubes disposed therein prior to assembly in the fuel injector housing.

FIG. 6 is a sectional view of an example of a straight secondary fuel tube having an undulating primary fuel tube disposed therein prior to assembly in the fuel injector housing.

FIG. 7 is a sectional side view of an example of an undulating secondary fuel tube having a straight primary fuel tube disposed therein prior to assembly in the fuel injector housing.

DETAILED DESCRIPTION

Figure 1:
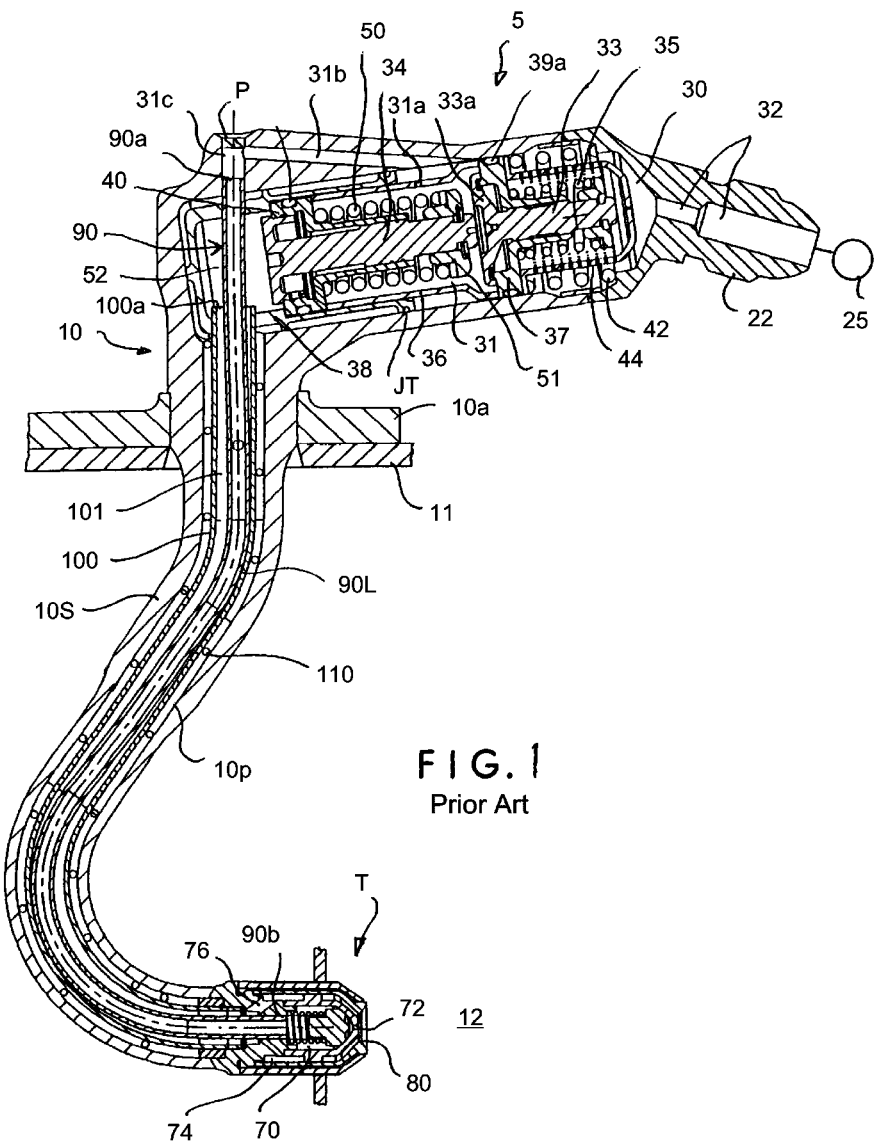
FIG. 1 is a cross-sectional view of an example pressure atomizing fuel injector pursuant to an illustrative embodiment of the present invention.

Referring to FIGS. 1-2, a pressure atomizing fuel injector 5 is shown. The fuel injector 5 includes a tubular injector housing 10 having a flange 10a fastened thereto and adapted to be fastened (e.g. bolted) to an engine housing 11 (shown schematically), and an injector tip T fastened to the injector housing 10 and disposed in an opening in a gas turbine engine combustor wall 12 a (partially shown). The fuel injector 5 shown employs pressure of the fuel to effect atomization of the fuel into the combustor 12, although in some embodiments air blast fuel injectors and/or hybrid air blast-pressure atomizing fuel injectors for gas turbine engine combustor fuel injection systems can be used.

Figure 1A:
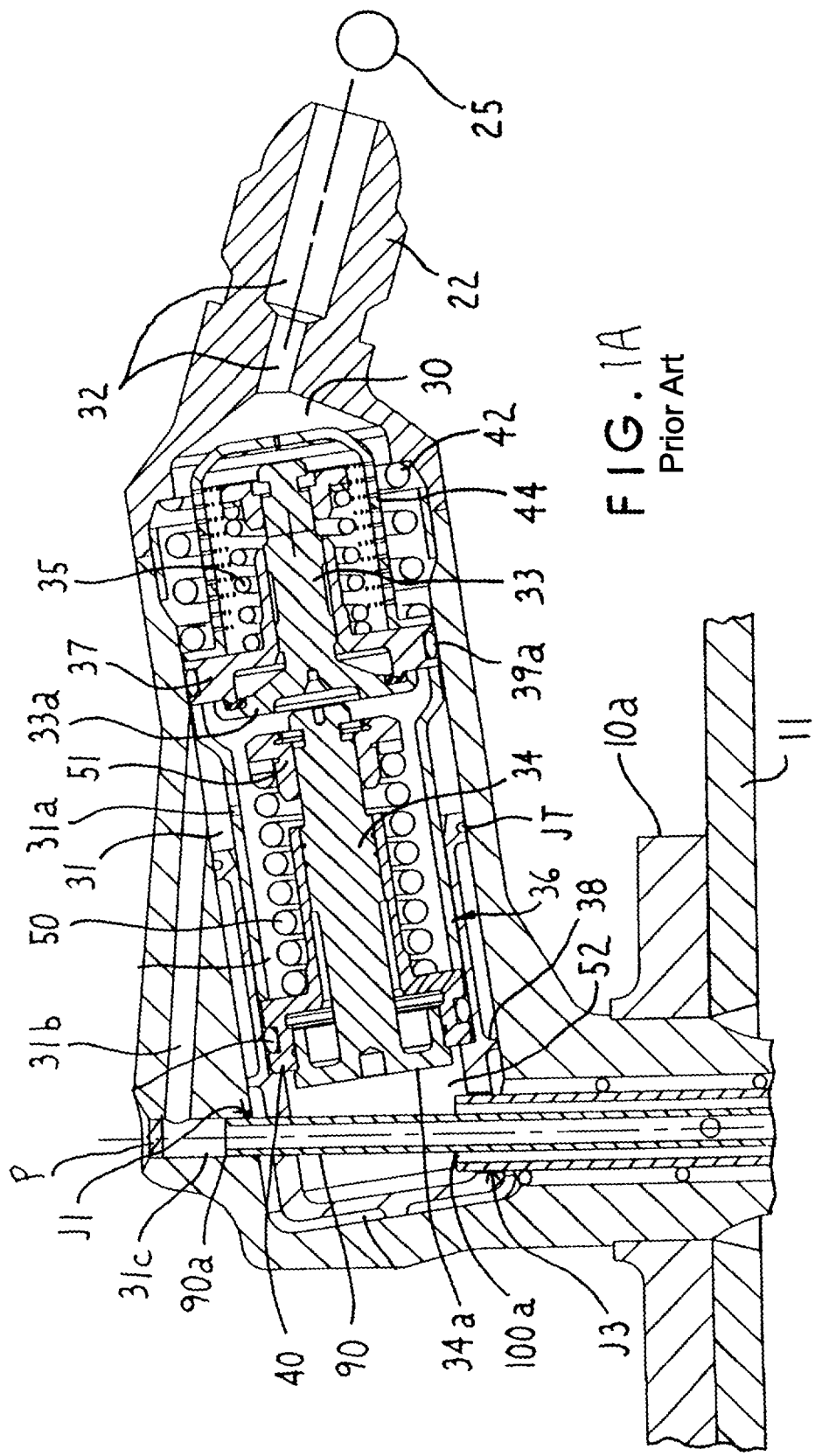
Figure 1B:
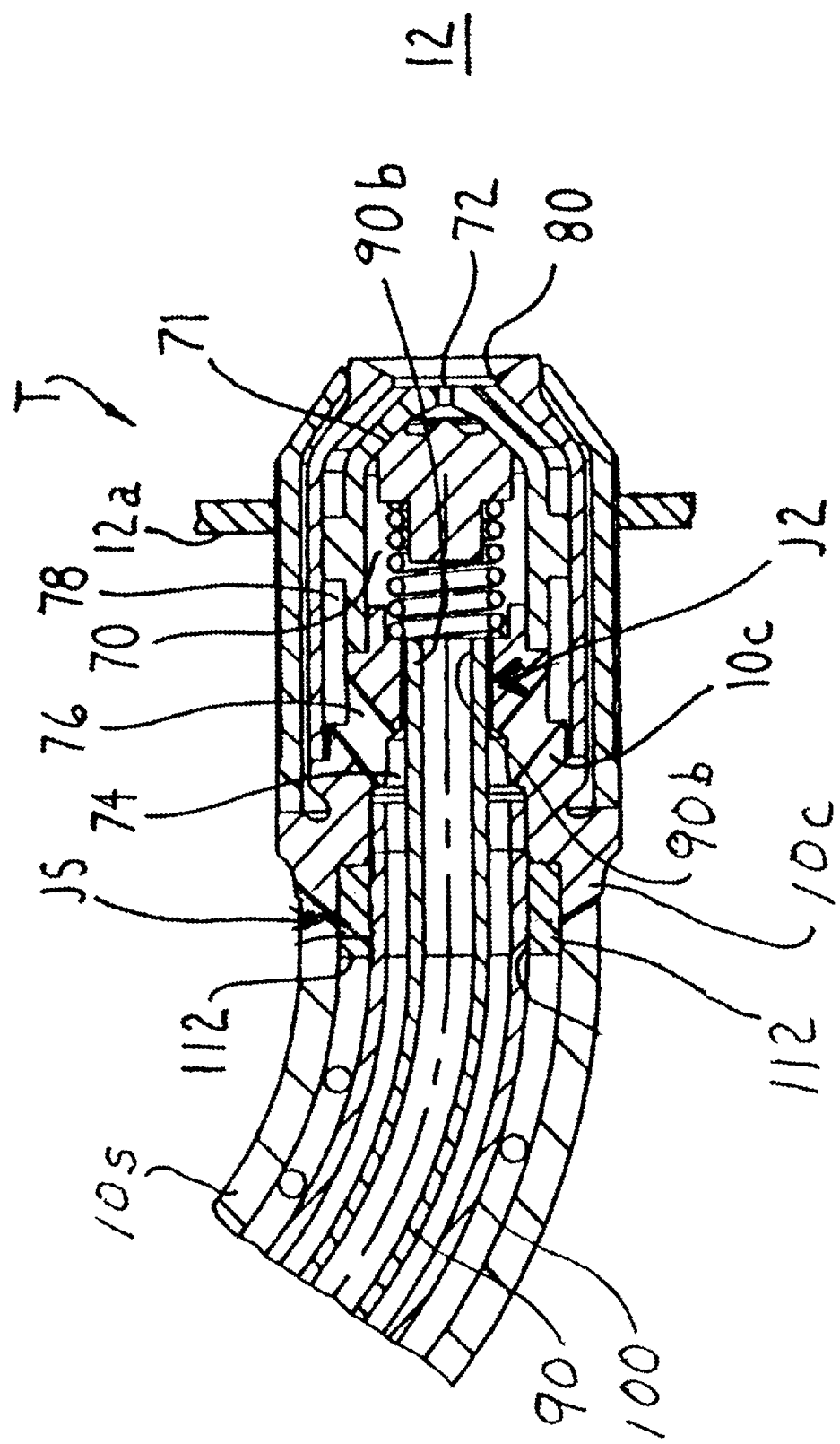
FIG. 1B is an enlarged cross-sectional view of the injector tip.

The fuel injector is shown in FIGS. 1, 1A and 1B including the injector housing 10 having an inlet fitting 22 that is supplied with pressurized fuel from a fuel manifold 25 and fuel pump (not shown). A collection of fuel injectors similar to injector 5 can be arranged about the combustor 12 and can be supplied with pressurized fuel from the manifold 25 in similar manner.

The inlet fitting 22 is communicated to an injector housing chamber 30 by passage 32. Disposed in the chamber 30 are a fuel check valve 33 and fuel metering valve 34 for controlling secondary fuel flow. The check valve 33 is biased by coil spring 35 such that head 33a of the check valve 33 is opened against spring bias relative to check valve seat 37 at a predetermined fuel pressure to supply pressurized fuel to primary fuel chamber 31 via one or more passages 31a. A passage 31a is provided in a valve support member 36 defining a secondary fuel chamber therein, FIG. 1A. The fuel chamber 31 communicates via passages 31b, 31c to open end 90a of an elongated primary fuel tube 90 to supply fuel thereto whenever the check valve 33 is open. A fuel tight plug P is disposed in passage 31c. The primary fuel tube 90 supplies the primary fuel flow from the open check valve 33 to central nozzle passage 70 and oblique nozzle passages 71 (one shown) to a central primary fuel discharge orifice 72 of the nozzle tip T for discharge as an atomized primary fuel spray cone into the combustor 12, FIG. 1B.

The metering valve 34 is disposed in the tubular valve support member 36. The valve support member 36 includes an end that is biased against check valve seat 37 and an opposite end held against support cup 38 by a coil spring 42. The support cup 38 is positioned in chamber 31 by braze joint JT. The coil spring 42 engages a flange of a perforated fuel filter screen or sleeve 44 against the check valve seat 37. In effect, the spring 42 holds the check valve seat 37, valve support member 36, support cup 38, and filter screen 44 in position in the chamber 31. Fuel-tight O-ring seals 39a, 39b are provided about the check valve seat 37 and secondary metering valve seat 40. Valve support member 36 is positioned in chamber 31 by braze joint JT.

The secondary metering valve 34 is biased relative to valve seat 40 by a coil spring 50 held in position on the stem of the secondary metering valve by spring retainer cap 51. Fuel in the valve support member 36 flows to the secondary valve head 34a via passages (e.g. 6 passages—not shown) in valve seat 40. The secondary valve 34 is held closed by spring 50 until fuel pressure reaches a preselected valve opening pressure. Then, the secondary fuel flow is metered to a chamber 52 by opening of the secondary valve 34 relative to the valve seat 40.

The chamber 52 communicates to open end 100a of elongated secondary fuel tube 100 to supply metered secondary fuel flow to an annular secondary fuel passage 101 defined between the primary fuel tube 90 and the secondary fuel tube 100. The secondary fuel passage 101 supplies metered secondary fuel to the annular passage 74 that communicates to oblique passages 76 and annular passage 78 of the nozzle tip T to supply the secondary fuel to annular secondary fuel discharge orifice 80 for discharge as an atomized secondary fuel spray cone into the combustor 12, FIG. 1B. As shown in FIGS. 1 and 2, the intermediate length 90L of the primary fuel tube 90 resides within the secondary fuel tube 100 in a strut portion 10s of the injector housing 10 such that secondary fuel flowing through the secondary fuel passage 101 during high power engine operation regimes exerts a cooling effect on the primary fuel tube 90. The secondary fuel tube 100 is spaced from the inner wall of the injector housing strut 10s by a Type 300 series austenitic stainless steel coil spacer spring 110 to provide a thermally insulating space between the housing strut portion 10s and the secondary fuel tube 100.

The end 90a of the primary fuel tube 90 extends beyond the secondary fuel tube 100 and is metallurgically joined to the injector housing 10. In some embodiments, metallurgical joining can include brazing, welding, soldering, or any other appropriate form of metallurgical joining technique. In some embodiments, non-metallugical joining techniques can be used, such as adhesives, friction fittings, compression fittings, or any other appropriate technique for joining metals. In particular, a region of the primary fuel tube 90 proximate the end 90a is brazed to the housing 10 to provide an annular braze joint J1 therebetween. The other opposite end 90b of the primary fuel tube 90 also extends beyond the secondary fuel tube 100 and is metallurgically joined to an injector nozzle tip adapter 10c to provide an annular braze joint J2 therebetween. The nozzle tip adapter 10c is welded to the end of the strut portion 10s at weld joint JS.

In some embodiments, the primary fuel tube 90 can be formed of HASTELLOY X alloy brazed at end 90a to the injector housing 10 also comprising HASTELLOY X alloy using a gold/nickel (AM4787) braze material. The end 90b of the primary fuel tube 90 can be brazed to the injector nozzle tip adapter 10c using the same braze material as described above. The end 100a of the secondary fuel tube 100 can be metallurgically joined (e.g., welded, soldered, brazed) to the support cup 38. For example, a region of the secondary fuel tube 100 proximate the end 100a can be brazed to the support cup 38 to provide an annular braze joint J3 therebetween. The other opposite end 100b of the secondary fuel tube 100 can be metallurgically joined to annular end sleeve 112 to provide a tack welded joint therebetween. The sleeve 112 is free to slide relative to the housing strut portion 10s.

FIG. 2 illustrates the primary fuel tube 90 disposed within the secondary fuel tube 100 before assembly in the injector housing 10. The primary fuel tube 90 is shown including an undulation 90c (e.g., random, spiral, helical) along its intermediate length between the ends 90a, 90b thereof with the undulating outer surface or wall engaging the inner surface or wall 100c of the secondary fuel tube in line-to-line interference contact at one or more locations L therebetween. The line-to-line interference engagement between the primary and secondary fuel tubes 90, 100 is effected by selecting the outer diameter OD of the undulation 90c of the primary tube (outer diameter relative to centerline of the secondary tube 100 in FIG. 2) and the inner diameter of the secondary fuel tube accordingly. For example only, the outer diameter OD of the undulation 90c of the primary fuel tube 90 can be 0.155 inch, while the inner diameter of the secondary fuel tube 100 can be 0.155 inch to this end. The non-secondary outer diameter of the primary fuel tube 90 can be 0.100 inch for the outer diameter OD of undulation 90c set forth.

Figure 4:
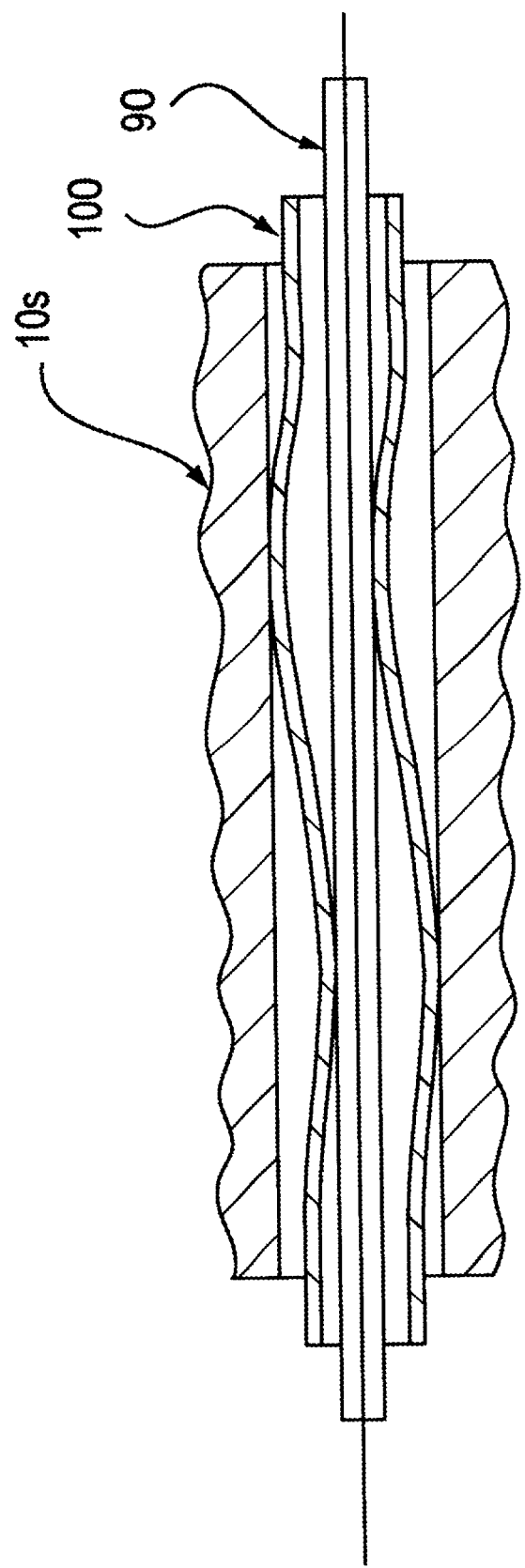
FIG. 4 is a sectional view of an example of a primary fuel tube received in undulating secondary fuel tube, both tubes in partially broken away strut of the fuel injector housing prior to bending of the strut.

In an alternative embodiment, the secondary fuel tube 100 can include an undulation, while the primary fuel tube 90 can be straight. In this embodiment, the secondary fuel tube 100 would include an undulation (e.g., random, helical, spiral) along its intermediate length between the tube ends with the undulating inner surface or wall engaging the outer surface or wall of the primary fuel tube 90, FIG. 4. The undulating outer surface of the secondary fuel tube 100 also can engage the wall of passage 10p of the strut portion 10s in line-to-line interference contact, whereby the inner surface of the secondary tube undulation engages the primary fuel tube 90 while the outer surface of the secondary tube undulation engages the wall defining the passage 10p. The spacer spring 110 thereby can be omitted in this embodiment to simplify construction, FIG. 4, which shows tubes 90, 100 in strut portion 10s prior to bending thereof to shape of FIG. 1.

In some embodiments, the undulation 90c can be a spiral having one complete helical turn having a pitch of 3.27 inches for example only, although 1½ to 2 spiral turns or more and other spiral pitch may be used in some embodiments depending upon the particular design of the fuel injector and primary and secondary fuel tubes. The length of the undulation 90c is selected to provide interference engagement along a sufficient portions or locations of the intermediate lengths of the primary and secondary fuel tubes 90, 100 effective to reduce or essentially eliminate heretofore observed fatigue failure at the brazed joints J1, J2 during service in a gas turbine engine and to permit increased axial compliance (decreased stress under a given axial deflection) of the primary tube 90 during thermal expansion of the injector support housing to thereby lower thermally induced internal stresses imparted by a given thermal strain caused by rigid attachment of the relatively cool primary tube 90 to the relatively hot support housing 10 and increasing fatigue life.

Figure 3:
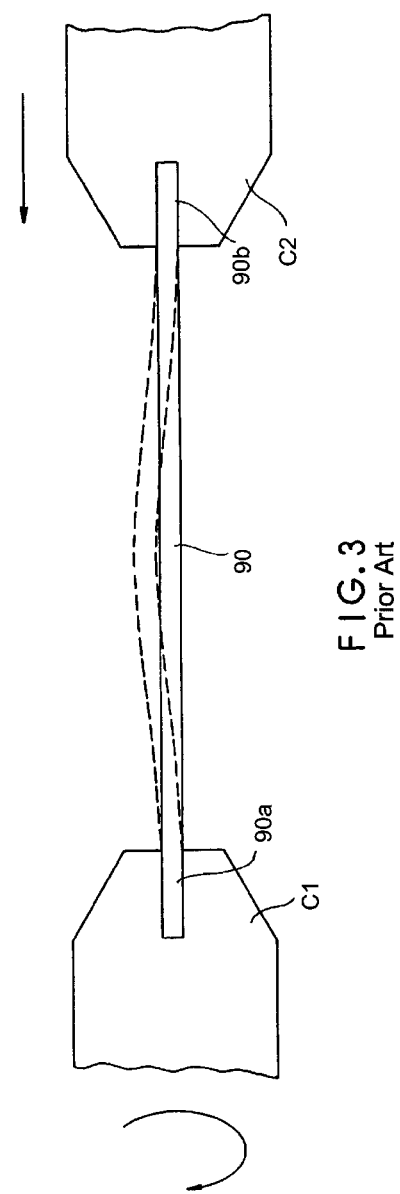
FIG. 3 is a schematic view of an example of an apparatus for imparting an undulation to the primary fuel tube.

In some embodiments, the primary fuel tube 90 can be imparted with the undulation 90c in a manner illustrated schematically in FIG. 3. In particular, the opposite ends 90a, 90b of the primary fuel tube can be clamped in collet chucks or clamps C1, C2 of a lathe (not shown). The primary fuel tube 90 so fixtured in the collet clamps C1, C2 then is bowed to an arcuate profile shown in dashed lines from its original straight tube profile. Bowing is effected by tube buckling to an extent to provide the aforementioned outer diameter OD of the undulation 90c. Then, the bowed primary fuel tube 90 is deformed by rotating one of the clamps C1, C2, or both, a selected angular extent to form the undulation 90c with the turn(s) and pitch desired. For example, one of the collet clamps C1, C2 can be rotated somewhat greater than 360 degrees relative to the other to form a one turn helical spiral in the bowed primary fuel tube 90. Pitch of the helix can be determined by the degree of bowing and the buckled tube length between the collet clamps.

After formation of the undulations, the primary fuel tube 90 can be removed from the lathe, cleaned, and then inserted in the secondary fuel tube 100 as shown in FIG. 2 to provide the aforementioned line-to-line interference engagement along sufficient portions or locations of the intermediate lengths of the primary and secondary fuel tubes 90, 100 effective to reduce brazed joint fatigue failure during service in a gas turbine engine. For purposes of illustration only, a primary fuel tube 90 having an as-received straight outer diameter of 0.100 inch can be undulated in the manner described above and tested for proper spiral outer diameter OD by inserting the undulated primary fuel tube 90 first in a straight gaging tube (not shown) having an inner diameter of 0.160 inch and then in a second gaging tube (not shown) having an inner diameter of 0.150 inch. The undulated primary fuel tube 90 must pass through the first gaging tube but not the second gaging tube.

The subassembly 120 of the undulated primary fuel tube 90 in the secondary fuel tube 100 is inserted in the injector housing 10 prior to bending (deforming) of the strut portion 10s to its compound arcuate configuration shown in FIG. 1. The coil spring 110 is positioned about the secondary fuel tube 100. The primary and secondary fuel tubes 90, 100 and their associated components (e.g. strut end 10c, support cup 38, end sleeve 112, etc.) then are brazed or welded using conventional brazing/welding procedures. Subsequent bending of the strut portion 10s to its compound arcuate shape imparts the arcuate configuration shown in FIG. 1 to the subassembly 120 of the primary and secondary fuel tubes 90, 100. After bending, the primary fuel tube 90 retains its undulations 90c that remain in line-to-line interference engagement, FIG. 1, along sufficient portions or locations of the intermediate lengths with the inner wall of secondary fuel tube 100 effective to substantially eliminate heretofore-observed fatigue failure at the brazed joints J1, J2.

After the injector housing has been bent and machined to final envelope dimensions, the components of check valve 33, metering valve 34 and nozzle tip T are assembled to complete the fuel injector 5.

Tests of the fuel injector 5 described above have been conducted under simulated gas turbine engine conditions of $3 \times 10^7$ vibration cycles at greatest tip response resonance frequency with 12 g forced sinusoidal input at the injector flange 11 in three mutually perpendicular planes (axial, radial and tangential relative to the gas turbine engine axis). Additional separate thermal cycling tests have been conducted using 10,000 thermal shock cycles on the primary fuel tube where a cycle involves maintaining the nozzle strut 10 s and tip T at a temperature of greater than 950 degrees F., introducing room temperature water through the fuel passages for 0.16 seconds and terminating water flow for one minute, and then repeating the cycle. The fuel injector 5 did not exhibit fatigue failure at brazed joints J1, J2 in any of these simulated engine tests.

FIGS. 5A and 5B are sectional side and end views, respectively, of an example of a straight secondary fuel tube having multiple undulating primary fuel tubes disposed therein prior to assembly in the fuel injector housing. A primary fuel tube 90x, a primary fuel tube 90y, and a primary fuel tube 90z are disposed within the secondary fuel tube 100 before assembly in the injector housing 10. The primary fuel tubes 90x-90z are shown including an undulation (e.g., random, spiral, helical) along their intermediate lengths between the ends 90a, 90b thereof with the undulating outer surface or wall engaging the inner surface or wall 100c of the secondary fuel tube in line-to-line interference contact at one or more locations L therebetween. The line-to-line interference engagement between the primary fuel tubes 90x, 90y, 90z, and the secondary fuel tube 100 is effected by selecting the outer diameter OD of the undulation of the primary tubes (outer diameter relative to centerline of the secondary tube 100 in FIGS. 5A and 5B) and the inner diameter of the secondary fuel tube accordingly. For example, the outer diameters OD of the undulations of the primary fuel tubes 90x-90z can each be 0.155 inch, while the inner diameter of the secondary fuel tube 100 can be 0.155 inch to this end. The non-secondary outer diameters of the primary fuel tubes 90x-90z can be 0.100 inch for the outer diameters OD of undulations set forth.

FIG. 6 is a sectional view of an example of a straight secondary fuel tube having an undulating primary fuel tube disposed therein prior to assembly in the fuel injector housing. In some embodiments, FIG. 6 shows tubes 90 and 100 prior to bending thereof to shape of FIG. 1. In the illustrated example, the secondary fuel tube 100 is formed substantially straight, and the primary fuel tube 90 is formed with an undulating outer surface. In the illustrated example, the undulations of the primary fuel tube are substantially random (e.g., formed in a pseudo-random process). In some embodiments, the undulations of the primary fuel tube 90 can be formed with a regular pattern, such as a spiral, helical, wavy, sinusoidal, serpentine, or other appropriate undulating shape.

FIG. 7 is a sectional side view of an example of an undulating secondary fuel tube having a straight primary fuel tube disposed therein prior to assembly in the fuel injector housing. In some embodiments, FIG. 7 shows tubes 90 and 100 prior to bending thereof to shape of FIG. 1. In the illustrated example, the primary fuel tube 90 is formed substantially straight, and the secondary fuel tube 100 is formed with an undulating outer surface. In the illustrated example, the undulations of the secondary fuel tube are substantially random (e.g., formed in a pseudo-random process). In some embodiments, the undulations of the secondary fuel tube 100 can be formed with a regular pattern, such as a spiral, helical, wavy, sinusoidal, serpentine, or other appropriate undulating shape. In some embodiments, both the fuel tube 90 and the fuel tube 100 may be formed to have undulating shapes. In some embodiments, the secondary fuel tube 100 can be substantially straight, and at least partly take on the undulating shape of the primary fuel tube 100 as it is assembled into the undulations of the primary fuel tube 100.

Figure 8:
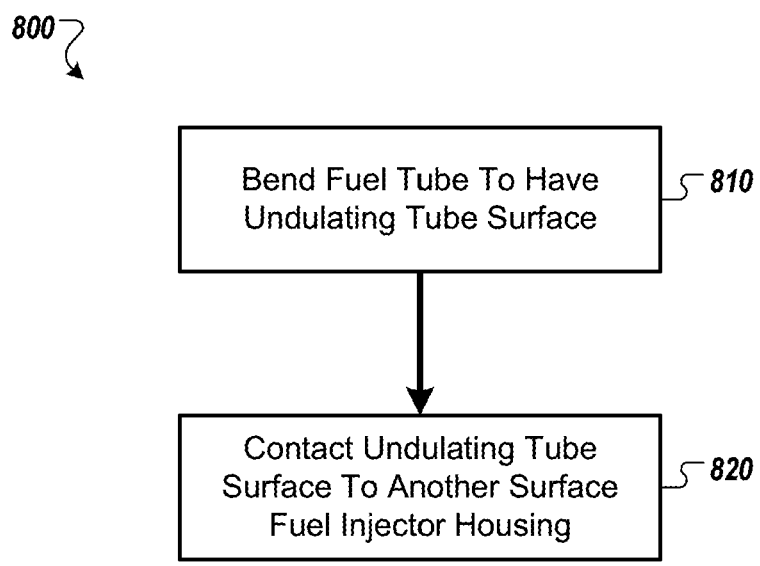
FIG. 8 is a flow diagram of an example of a process for making a fuel injector.

FIG. 8 is a flow diagram of an example of a process 800 for making a fuel injector. In some implementations, the process 800 can be used to form at least a part of the pressure atomizing fuel injector 5 of FIG. 1.

At 810, an elongated fuel tube having a tube surface is bent such that the tube surface is an undulating tube surface along at least a portion of its length. For example, in FIG. 6 the example primary fuel tube 90 is bent into an undulating form. In another example, in FIG. 7, the example secondary fuel tube 100 is bent into an undulating form.

At 820, the undulating tube surface is contacted to another surface disposed in a fuel injector housing at one or more locations of said undulating tube surface. For example, in FIG. 6, the primary fuel tube 90 is inserted into the secondary fuel tube 100 and the outer surface of the primary fuel tube 90 contacts points of the inner surface of the secondary fuel tube 100. In another example, the outer surface of the undulating secondary fuel tube 100 of FIG. 7 can be inserted into the annular secondary fuel passage 101 such that the outer surface of the secondary fuel tube 100 contacts points of the inner surface of the annular secondary fuel passage 101.

In some implementations, the process 800 can include forming spaced apart joints between said fuel tube and said housing, configured to hold said elongated fuel tube in position in said housing. For example, the primary fuel tube 90 can be brazed to form the annular braze joints J1 and J2.

In some implementations, the another surface can be an inner surface of a second fuel tube disposed about said elongated fuel tube in said housing. For example, in FIG. 6, the secondary fuel tube 100 is disposed about the primary fuel tube 90.

In some implementations, the another surface can be an outer surface of a second elongated fuel tube disposed inside said fuel tube in said housing. For example, in FIG. 7 the primary fuel tube 90 is disposed inside the secondary fuel tube 100.

In some implementations, the another surface can defines a passage in an injector strut. For example, the annular secondary fuel passage 101 has an inner surface.

In some implementations, the another surface can include an inner surface of a second fuel tube disposed about said second elongated fuel tube in said housing. For example, in FIGS. 5A-5B, the outer surfaces of the primary fuel tubes 90x-90z contact the inner surface of the secondary fuel tube 100.

In some implementations, bending the elongated fuel tube can include forming said undulating tube surface as a helical or spiral tube surface. For example, in FIG. 2, the primary fuel tube 90 is shown as having a periodic undulation that is representative of a helix or spiral.

In some implementations, the process 800 can include bending a second elongated fuel tube having a second tube surface such that the second tube surface is a second undulating tube surface along at least a portion of its length, and contacting the second undulating tube surface to said surface disposed in said fuel injector housing at one or more locations of said second undulating tube surface. For example, the assembly of FIGS. 5A-5B can be bent lengthwise to conform to the shape of the annular secondary fuel passage 101 of FIG. 1.

In some implementations, the process 800 can include bending the another surface based on the contacting. For example, referring to FIG. 6, the fuel tube 90 can be forced into the interior of the fuel tube 100, and as a result, the fuel tube 100 can take on a partly undulating shape by partly conforming to contact points of the fuel tube 90. In another example, referring to FIG. 7, the fuel tube 90 can be forced into the interior of the fuel tube 100, and as a result, the fuel tube 90 can take on a partly undulating shape by partly conforming to contact points of the fuel tube 100.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fuel tube assembly for a gas turbine engine fuel injector, comprising:
    an outer housing comprising an internal surface of the outer housing and having a uniform thickness; and
    an elongated fuel tube affixed to said outer housing by a plurality of spaced apart joints and including an undulating tube outer surface along at least a portion of a length of the elongated fuel tube between said spaced apart joints, said undulating tube outer surface of the elongated fuel tube being in direct contact with the internal surface of the outer housing at one or more undulations of said undulating tube outer surface between said spaced apart joints, wherein the undulating tube outer surface comprises one or more of a pseudo-random, sinusoidal, or serpentine shape, and said undulating tube outer surface is also in direct contact with an outer surface of a second elongated fuel tube disposed inside said outer housing.

2. The fuel tube assembly of claim 1, wherein a pair of opposite end regions of said elongated fuel tube are affixed to said outer housing and said undulating tube outer surface of the elongated fuel tube extends from one of said pair of opposite end regions to the other of said pair of opposite end regions.

3. The fuel tube assembly of claim 2, wherein said pair of opposite end regions of said elongated fuel tube comprise metallurgically joined joints.

4. The fuel tube assembly of claim 1, wherein said internal surface of the outer housing comprises an inner surface of a second fuel tube disposed about said elongated fuel tube in said outer housing.

5. The fuel tube assembly of claim 1, wherein said internal surface of the outer housing defines a passage in an injector strut.

6. The fuel tube assembly of claim 1, wherein said undulating tube outer surface forms a helical or spiral tube surface.

7. The fuel tube assembly of claim 1, wherein the second elongated fuel tube includes a second undulating tube surface along at least a portion of a length of the second elongated fuel tube, said second undulating tube surface being in contact with said undulating tube outer surface at one or more locations of said second undulating tube surface wherein the second undulating tube surface comprises one or more of another pseudo-random, sinusoidal, or serpentine shape.

8. A method of assembling a fuel tube assembly for a gas turbine engine fuel injector, the method comprising:
    a step of providing an outer housing comprising an internal surface of the outer housing and having a uniform thickness;
    a step of bending an elongated fuel tube to define an undulating tube outer surface of the elongated fuel tube along at least a portion of a length of the elongated fuel tube;
    a step of affixing said elongated fuel tube to said outer housing by a plurality of spaced apart joints; and
    a step of directly contacting the internal surface of the outer housing at one or more undulations of said undulating tube outer surface of the elongated fuel tube along at least the portion of the length of the elongated fuel tube between said plurality of spaced apart joints, wherein the undulating tube outer surface comprises one or more of a pseudo-random, sinusoidal, or serpentine shape, and said undulating tube outer surface of the elongated fuel tube is also in direct contact with an outer surface of a second elongated fuel tube disposed inside said outer housing.

9. The method of claim 8, wherein said spaced apart joints comprise metallurgically joined joints configured to hold said elongated fuel tube in position in said outer housing.

10. The method of claim 9, wherein said internal surface of the outer housing comprises an inner surface of a second fuel tube disposed about said elongated fuel tube in said outer housing.

11. The method of claim 8, further comprising bending the outer housing based on the step of directly contacting the internal surface.

12. The method of claim 8, wherein said internal surface defines a passage in an injector strut.

13. The method of claim 8, wherein the step of bending said elongated fuel tube comprises forming said undulating tube outer surface as a helical or spiral tube surface.

14. The method of claim 8, further comprising:
    a step of bending the second elongated fuel tube to define a second undulating tube outer surface along at least a portion of a length of the second elongated fuel tube; and
    a step of directly contacting the undulating tube outer surface at one or more undulations of said second undulating tube outer surface along at least the portion of the length of the second elongated fuel tube.

* * * * *